United States Patent [19]

Baruffalo

[11] Patent Number: 4,773,276
[45] Date of Patent: Sep. 27, 1988

[54] NORMAL FORCE MEASURING GAUGE

[75] Inventor: Bernard A. Baruffalo, East Berlin, Pa.

[73] Assignee: E. I. Du Pont de Nemours and Company, Wilmington, Del.

[21] Appl. No.: 21,690

[22] Filed: Mar. 4, 1987

[51] Int. Cl.⁴ .............................................. G01L 5/00
[52] U.S. Cl. .................................... 73/862.01; 73/161
[58] Field of Search .......... 73/862.01, 862.53, 862.54, 73/862.61, 161, 862.55

[56] References Cited

U.S. PATENT DOCUMENTS

| 2,789,430 | 4/1957 | Sinclaire | 73/862.01 X |
| 4,353,250 | 10/1982 | Perlin | 73/862.53 X |
| 4,667,512 | 5/1987 | Buddwalk | 73/862.65 X |
| 4,668,466 | 5/1987 | Rylatt | 73/161 X |

Primary Examiner—Charles A. Ruehl

[57] ABSTRACT

A normal force measuring assembly for measuring the normal force exerted by a female receptacle. The force measuring assembly uses a conventional force gauge in which a pair of anvils are used to effect the measurement itself. One of the anvils is fixed. The remaining anvil is movable according to the force exerted by the force gauge and its position is sensed by an optical detector.

4 Claims, 3 Drawing Sheets

NORMAL FORCE MEASURING GAUGE

BACKGROUND OF THE INVENTION

This invention relates to a normal force measuring gauge and, more particularly, to a force gauge for measuring the normal force that would be exerted by the beams of a female electrical connector on the sides of the pins of a male connector.

With the advent of electrical connectors for use with microchips it is becoming necessary to ensure that the insertion force required for inserting the pins of a male connector into the receptacles of a female connector be carefully regulated. A high normal force will cause a high insertion force while a low normal force can cause a loss of contact integrity. To achieve this, the elements or beams of the female connector must exert or be adjusted to exert a precise amount of a normal force against the sides of the male connect pin. Thus, during production of the connectors, it is necessary to measure this normal force exerted by each female connector receptacle. Such measurements are not easily accomplished since the pins such as those used in the high pin count connector systems are quite small, typically 0.025 inches (0.9635 cm) square. Thus, any measuring mechanism which is inserted into the female receptacle must of necessity be relatively tiny and yet must be precisely held and manipulated so as to measure the exact components of the normal force of the connector beams and not any extraneous forces. It is particularly difficult to measure such normal forces, for example, without measuring the weight of the measuring elements.

SUMMARY OF THE INVENTION

The normal force measuring gauge of this invention meets these requirements and is able to measure only the normal force without measuring the extraneous weights of the elements used to affect the measurement. According to this invention, a normal force measuring assembly for measuring the normal force exerted by a female electrical connector on the pin of a male electrical connector comprises: a first ball slide having a fixed element and a movable element, first and second anvils aligned together to simulate a pin of an electrical connector, the first anvil being rigidly secured to the moveable element and positioned above the second anvil, the second anvil being rigidly secured to the fixed element, an optical position detector having a sensing region defined by a light source and a photodetector, a flag secured to the movable element and extending into the sensing region to permit its position to be detected by the detector, and a force gauge having a force sensing element positioned to support vertically the movable element, said force gauge being positionable vertically to adjust the position of the movable element relative to the fixed element, thereby to separate the anvils and hence the beams of a female electrical connector positioned on the anvils. With this arrangement, only the desired repositioning of the anvils is detected. The varying compression of the force gauge under a test load is not detected. There is no mechanical interaction with or extraneous forces applied to the test assembly.

In a particular embodiment of this invention the force gauge is slidably mounted and includes a travel platform adapted to adjust the vertical position of the force gauge. The normal force measuring assembly may include a test stand on which the travel platform is adjustably mounted and the force gauge is slidably mounted. With this arrangement the normal force measuring assembly measures only the forces exerted by the beams of the female receptacle and is not affected by the mass of the equipment used to affect the measurement.

BRIEF DESCRIPTION OF THE DRAWINGS

The invention will be better understood by reference to the accompanying drawings in which.

DETAILED DESCRIPTION OF THE PREFERRED EMBODIMENT

Figure 1:
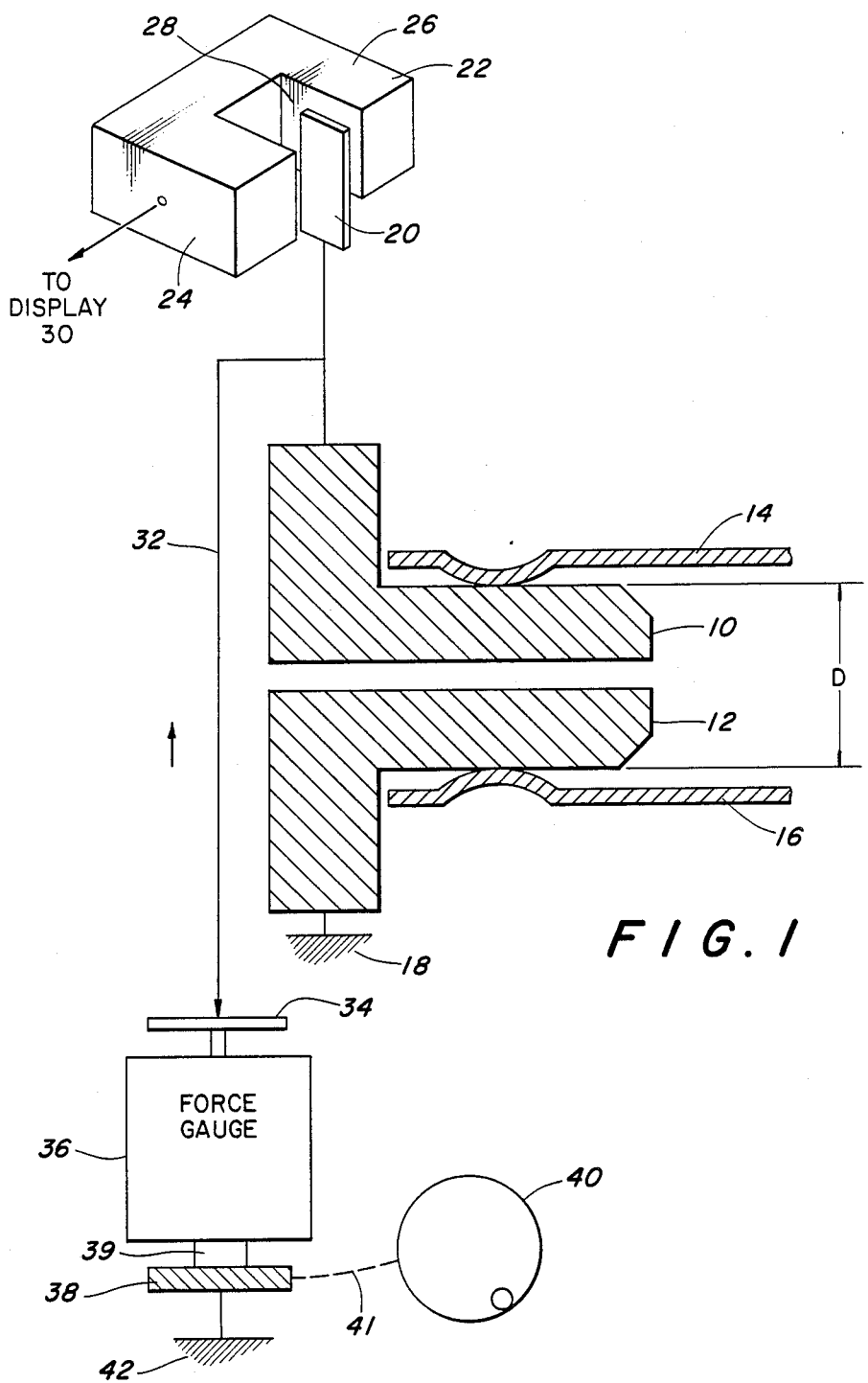
FIG. 1 is a schematic representation of a normal force measuring assembly constructed in accordance with this invention.

There may be seen in the schematic representation of FIG. 1 a normal force measuring assembly constructed in accordance with this invention. The assembly includes a pair of tiny anvils i.e., and an upper anvil 10 and a lower anvil 12, which together have a cross sectional area that will permit them to be fitted into a receptacle defined by the spring beams 14 and 16 of the receptacle of a female connector. These anvils 10 and 12 are elongated, and generally parallel to each other i.e. they are aligned together to simulate the pin of a male electrical connector. The lower anvil 12 is fixedly connected to a rigid support as at 18 whereas the upper anvil 10 is slidably positioned so it is able to move upwardly and downwardly along a vertical axis (not shown). The upper anvil 10 is connected to a flag 20 which is positioned in the sensing region 28 of a position detector 22.

The detector 22 may be of conventional design and may be formed by a light emitting diode (LED) 24 and a phototransistor 26 with the light from the LED 24 impinging on the phototransistor 26 to provide the sensing region 28. A suitable position detector of this type, for example, is the TIL-148A source and detector assembly sold by Texas Instruments. The linear movements of the flag 20 to be detected by the sensing region 28 are relatively small since the anvils 10, 12, have a cross section area slightly less than that of a connector pin. This means that the anvils together are typically less than the cross section area of a connector pin which typically can be in the order of 0.025 inches square. Hence each anvil has a thickness less than one half of that amount so that when they are slightly separated, as will be described, they will define a region equal to the cross section of the pin it simulates. A display 30 is connected to the position detector 22 to provide a readout indicating the amount of motion of the flag 20. Typically, the linear detector can be reset to "0" at any position of the flag within the sensing region of the display.

The upper anvil 10 is also rigidly connected through a mechanical linkage 32 to contact a sensing element 34 of an electronic load cell or springloaded force gauge 36 which itself is slidable in a vertical direction. Force gauge 36 has a lower element 39 which rests on a travel platform 38 that is adjustably secured to a rigid support 42. The vertical position of the travel platform 38 and hence the force gauge may be adjusted by a handwheel 40 or other suitable mechanism operating through a mechanical linkage 41. A force gauge suitable for these purposes is the model CTM test stand available from Ametec.

As may be seen schematically in FIG. 1, if the specification for example of a particular female connector requires the beams 14 and 16 to exert a normal force of 50 gms on the pins of a connector with pins 0.025 inches square, such measurement is made by adjusting the spacing of the anvils 10 and 12. This is accomplished by raising or lowering the force gauge 36 by means of the handwheel 40 until the overall distance D measured from the outside of the anvils 10 and 12 corresponds to the desired separation distance corresponding to a connector pin. The position of the flag 20 in the position detector 22 is noted and the receptacle to be measured is positioned with its beams 14, 16 over the anvils 12 so as to squeeze the anvils together. The handwheel 40 is now adjusted to raise the upper anvil 10 until the spacing D is again the desired separation distance, in this case 0.025 inches. The change in the force exerted by the force gauge to affect this adjustment is measured and the result is a measurement of the normal force executed by the beams of the female connector.

Figure 2:
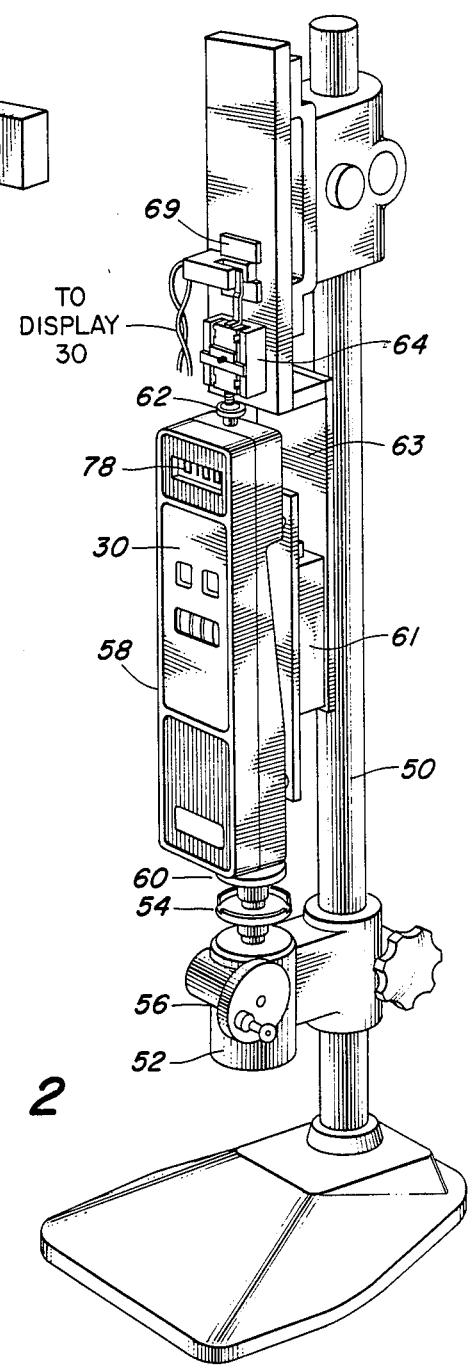
FIG. 2 is a perspective view of a normal force measuring assembly constructed in accordance with this invention.
Figure 3:
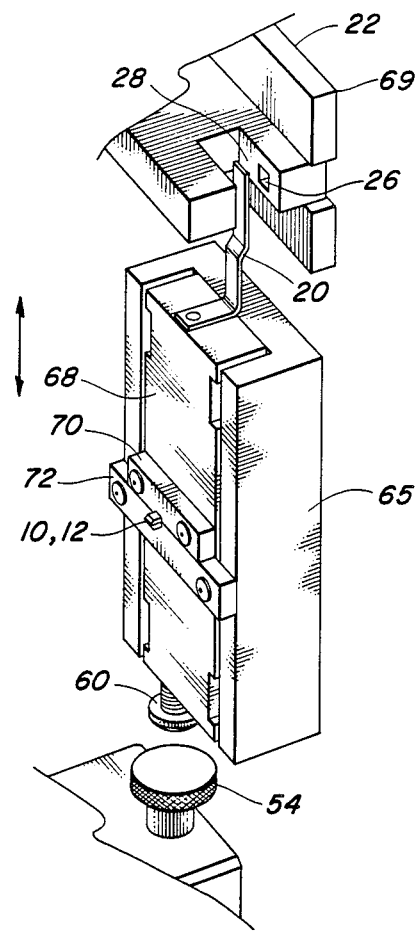
FIG. 3 is an enlarged perspective view of a portion of the force gauge of FIG. 2.
Figure 4:
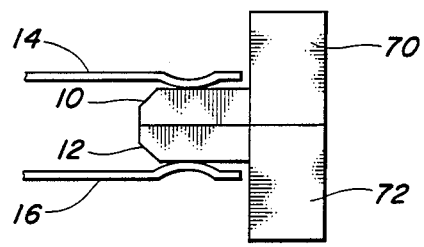
FIG. 4 is a fragmentary side view of the beam of a female connector engaging the test anvils of FIG. 2.
Figure 5:
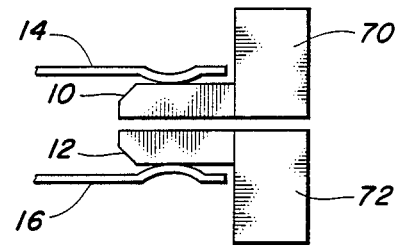
FIG. 5 is a side elevation view of FIG. 4 with the anvils separated.

A preferred assembly for effecting this measurement may be best seen with reference to FIGS. 2 and 3. In these figures there may be seen all of the elements of the assembly are mounted on a single test stand 50 in which an actuating head 52 is adjustably positioned on the lower portion of the stand 50. The actuating head 52 has a travel platform 54 whose vertical position is adjustable by a worm gear drive driven by a handwheel 56.

The force gauge 58, which has a measuring element 62 and a bottom contact point 60, is mounted on the movable portion of a ball slide 61 with the base of the ball slide being fixedly secured to the test stand 50 as by a bracket 63. In this manner the gauge 58 is movable vertically so that the contact point 60 may rest on the travel platform 54. The anvils 10 and 12 are supported by a second ball slide 64 (FIG. 3) having a U-shaped back or fixed element 65 secured to the bracket 63 on the test stand 50 and a movable portion 68 slideable within the fixed element 65. The lower anvil 12 is secured to the fixed back element 65 by a bar 72 (FIG. 3) whose ends are attached as by screws to the fixed back element 65. The upper anvil 10 on the other hand is secured as by screws at the ends of a bar 70 to the movable portion 68 of the ball slide 64.

The mounting bar 70 in an integral structure which is formed with the anvil 10 cantilevered from the mid portion thereof. Likewise, the mounting bar 72 is formed integrally with the lower anvil 12 cantilevered from the midportion such that when the movable portion 68 of the second ball slide 64 is adjusted vertically, the anvils 10, 12 may contact each other. A flag 20 is attached to the upper portion of the movable portion 68 of the second ball slide 64 and extends upwardly so as to be positioned within the sensing region 28 of the position detector 22. The slide or movable portion 68 rests on the measuring element 62. The detector 22 is held by support blocks 69 attached to the bracket 63. The position detector 22 provides an output to a display 30. The force gauge 36 has a display 78 directly on its face 30. The force gauge may be reset to "0" by actuating appropriate buttons (not shown).

Figure 6:
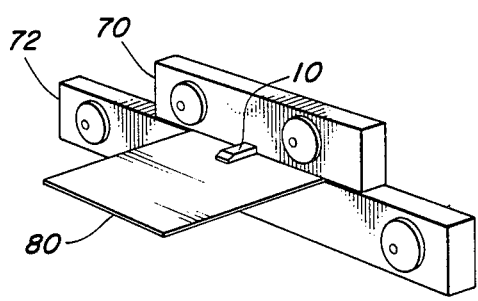
FIG. 6 is a perspective view of the anvils of FIG. 4 with an adjusting shim.

In use, one must initially ensure the upper anvil 10 is properly seated against this measuring element 62 of the force gauge 36 and that the contact point 60 is properly seated on the travel platform 54. Next a shim 80 (FIG. 6) is positioned between the anvils 10, 12 to provide the desired distance corresponding to the cross sectional dimension of a pin that is to be used with the female receptacle of the connector. At this point the display of the position detector 22 is set to "0". The shim 80 is removed and the travel platform 38 adjusted by manipulation of the handwheel 40 until the linear transducer returns to "0". At position "0", the force gauge 36 is also set to "0" with its internal spring or load cell element being the only mechanism holding the upper anvil 10 in its position.

Figure 7:
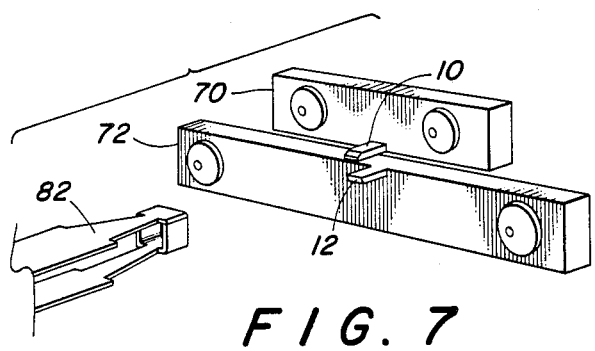
FIG. 7 is a perspective view of a female receptacle being positioned over the anvils.

At this point the receptacle 82 (FIG. 7) to be tested is positioned over the anvils 10, 12. This causes the anvils to move together because of the normal forces exerted inwardly by the spring beams of the receptacle 82. The travel platform 38 is again adjusted by means of the handwheel 40 until the position detector again returns to "0" ensuring that the distance D between the outside of the anvils is now at the test distance of, in this case, 0.025 inches. Now by simply reading the force gauge the normal force exerted by the female receptacle is indicated.

There is thus been described a relatively simple normal force measuring assembly in which the relatively difficult measurement of a normal force exerted by a tiny female connector receptacle can be readily, simply, and easily measured using inexpensive test equipment.

What is claimed is:

1. A normal force measuring assembly for measuring the normal force exerted by a female electrical connector or the pin of a male electrical connector comprising:
    a first ball slide having a fixed element and a movable element,
    first and second anvils aligned together to simulate a pin of an electrical connector, the first anvil being rigidly secured to the movable element and positioned above the second anvil, the second anvil being rigidly secured to the fixed element,
    an optical position detector having a sensing region defined by a light source and a photodetector,
    a flag secured to the movable element and extending into the sensing region to permit its position to be detected by the detector, and
    a force gauge having a force sensing element positioned to support vertically the movable element, said force gauge being positionable vertically to adjust the position of the movable element relative to the fixed element, thereby to separate the anvils and hence the beams of a female electrical connector positioned on the anvils.

2. A normal force measuring assembly as set forth in claim 1 wherein the force gauge is slidably mounted and which includes a travel platform adapted to adjust the vertical position of the force gauge.

3. The assembly of claim 2 which also includes a test stand, the first ball slide and travel platform being adjustably mounted thereon and the force gauge being slidably mounted thereon.

4. The assembly of claim 1 which also includes a test stand, the first ball slide and travel platform being adjustably mounted thereon and the force gauge being slidably mounted thereon.

* * * * *